ary
3,307,037
FLUID PRESSURE ACTUATED RECIPROCATING FILM CARRIAGE FOR AN X-RAY SPOT FILM DEVICE
Eugene P. Thomas, Baltimore, Md., assignor to Westinghouse Electric Corporation, East Pittsburgh, Pa., a corporation of Pennsylvania
Filed June 22, 1964, Ser. No. 376,913
4 Claims. (Cl. 250—66)

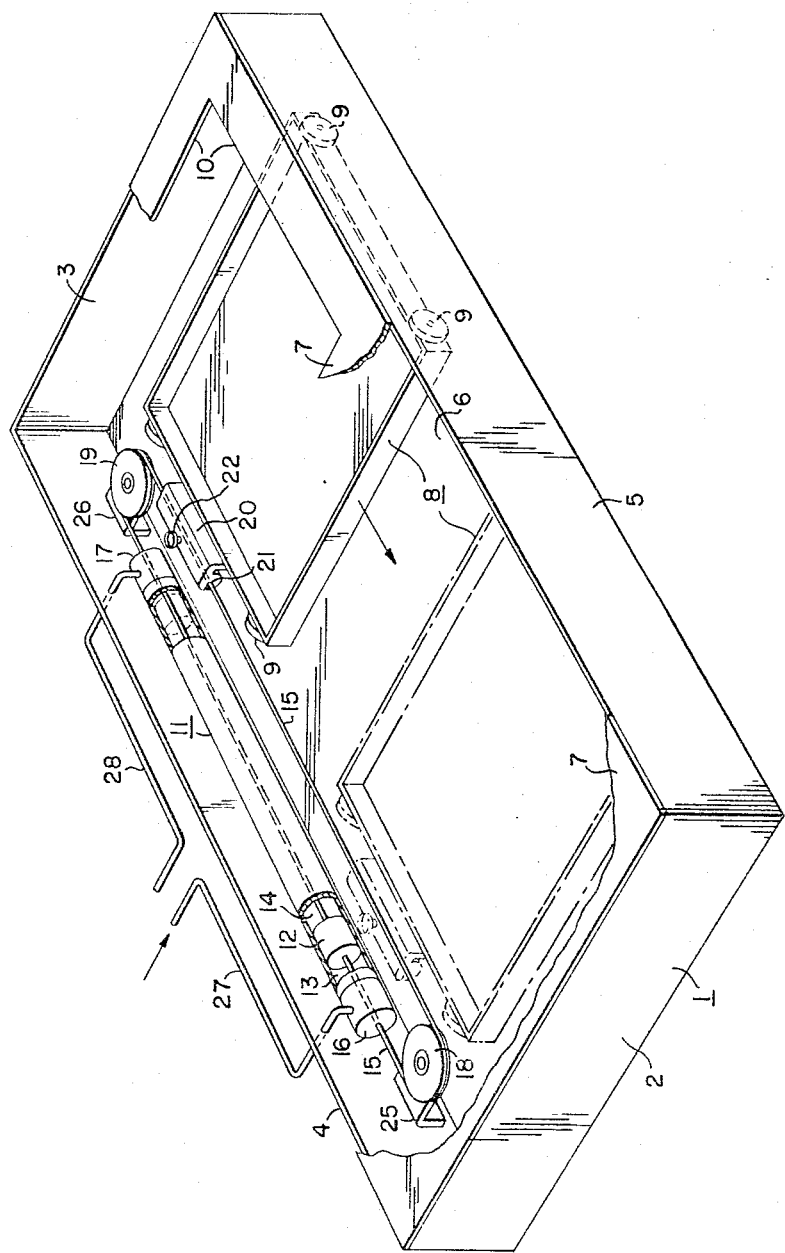

The present invention relates to X-ray apparatus, and more particularly to actuating mechanism affiliated with film-transporting or film carriage means in X-ray apparatus such as spotfilm devices.

It is an object of the present invention to provide an improved film-transporting device for the positioning of an X-ray film for exposure to X-rays in making X-ray photographs.

It is another object of the present invention to provide in an X-ray apparatus an improved actuating mechanism for shifting a film carrier between a number of predetermined positions within such apparatus.

It is a further object of the present invention to provide in an X-ray apparatus an improved actuating mechanism for effecting linear movement of a film cassette carriage which is characterized by compactness and simplicity as well as rapid and quiet operation.

It is a further object of the present invention to provide in an X-ray apparatus an improved actuating mechanism for actuating a film cassette carriage between a park or load position and one or more active or exposure positions.

It is another object of the present invention to provide in an X-ray apparatus an improved fluid pressure operated mechanism for actuating a cassette carriage in both directions between load and exposure positions.

In accordance with general features of the invention, the above objects are realized by the provision, in an X-ray apparatus such as a spotfilm device employing a film cassette carriage movable reciprocably between load and exposure positions, of a fluid pressure cylinder device having a double-acting piston which is operatively connected to the cassette carriage by way of cable and pulley means, in effect flexible piston rod means, which performs smoothly, rapidly and quietly and affords compactability in obviating need for accommodation of rigid piston rod travel or resort to complex telescopic cylinder arrangements.

The foregoing and other objects, advantages, and features of the invention will become apparent from the following more detailed description of an illustrative embodiment of the invention, when taken in connection with the accompanying drawing in which the single figure is a three-dimensional view, partly in section and partly in outline of an X-ray spotfilm device embodying an exemplification of the invention.

Referring to the drawing, there is shown a spotfilm device which typically comprises an elongated, hollow, rectangular housing or frame means 1 having front and back wall members 2 and 3, side wall members 4 and 5, and top and bottom wall members 6 and 7. Disposed within the housing 1 there is a cassette tray or film cassette carriage means 8 adapted to receive a film cassette (not shown) and provided with rollers 9 cooperable with such as the bottom wall member 6 of the housing for facile movement between a park or load position, in which it is shown in the drawing at the rear of the housing, and an exposure position near the front of the housing, such as indicated by phantom outline. A loading aperture 10 in the top wall member 7 near the rear of the housing serves the usual function of providing for insertion and removal of the film cassette into and out of the carriage means 8 when in its park position in which it is shown. In the frontward exposure position of the carrier means 8, X-rays transmitted through a patient or object (not shown) undergoing examination will reach the X-ray film (not shown) being borne by such carriage means by way of the bottom wall member 6, or X-ray transparent portion thereof, in the well-known manner, and expose such film for the X-ray picturization of internal organs or parts of such object or patient.

In accord with novel features of the present invention, the cassette carriage means 8 is actuated between its park and exposure positions by a double-acting fluid pressure operated cylinder means 11, which is mounted within the housing 1 in extension along the side wall member 4 parallel to the direction of such carriage means 8. The cylinder means 11 comprises a piston 12 reciprocably disposed therein which is subject opposingly to pressure of fluid in chambers 13 and 14 at its opposite end faces, respectively, and which will move toward one end of the other of the cylinder upon establishment of a preponderance in fluid pressure in one or the other chamber 13 or 14. The piston 12 is operatively connected to the film-cassette carriage means 8 by way of a flexible cable means 15, which may be nylon-covered steel cable, for example, secured to and extending in elongated loop-like fashion generally parallel to side wall 4 from opposite ends of such piston, outwardly through cylinder heads or end caps 16 and 17, around pulleys 18 and 19, to a point or region of securement on a side-projecting anchor member 20 attached to such cassette carriage means. Any suitable means for introducing and securing the cable means 15 to member 20 may be employed, as by insertion in a side groove 21 in member 20 and being locked in place by a lock screw 22. Pulleys 18 and 19 are mounted on the side wall 4 via brackets 25 and 26, thus occupying fixed positions in the housing 2 relative to which the carriage means 8 moves. Tubing means 27 and 28 connected to chambers 13 and 14, respectively, via end caps 16 and 17 on the cylinder 11 provide for selective conveying of fluid under pressure to and from these chambers to operate the cylinder. The piston 12 is in slidable fluid-pressure-sealed contact with the inner cylindrical wall of the cylinder 11, as will be apparent, and the cable means 15 is in slidable pressure sealed cooperation with end caps 16 and 17, as by use of O-ring seals (not shown) which cooperate with the smooth outer surface of the flexible plastic covering on such cable means.

As will be appreciated from the foregoing description, by selective pressurization of the cylinder chambers 13 and 14, the piston 12 will be pressure actuated toward one end or the other of the cylinder 11 to pull the cassette carriage means between its park and exposure positions through the medium of the flexible cable means 15 while passing around the pulleys 18, and the anchor member 20. It will also be appreciated that the operation of such mechanism is adapted and suited for rapid quiet operation, and that the entire assemblage including the cylinder 11, pulleys 18 and 19, and cable means 15 constitutes a relatively simple, narrow actuating mechanism which extends little if any further along the side wall 4 than the length of the path of front-to-back travel of the cassette carriage means.

While there has been shown and described herein an illustrative embodiment of the invention with a certain degree of particularity, modifications may readily occur to those versed in the art. It is not desired, therefore, that the invention be limited to the specific arrangements shown and described and it is intended to cover in the appended claims all such modifications as fall within the true spirit and scope of the invention.

I claim as my invention:

1. In X-ray apparatus including a frame means and a film carriage means movable in said frame means along a linear path from one position to another, the combination therewith of a fluid pressure cylinder mounted on said frame means parallel to said path, said cylinder including a reciprocable piston member and an end cap defining in cooperation with the interior of said cylinder a pressure chamber therebetween, flexible cable means in pressure-sealed extension through said end cap and secured to said piston member to be pulled through said end cap upon pressurization of said chamber, said cable means being secured externally of said cylinder to said film carriage means, and pulley means mounted on said frame means at a fixed location adjacent to one end of said cylinder for reversing direction of movement of said cable means such that pulled movement thereof by said piston in one direction results in film carriage movement in the opposite direction.

2. In an X-ray apparatus including a film carriage means movable in opposite directions between two positions, the combination therewith of a double-acting cylinder including a reciprocable piston therein, a loop of cable attached to said piston and extending oppositely therefrom through ends of said cylinder, fixed pulley means directing movement of said loop of cable entering and leaving said cylinder along a path extending in the direction of movement of such carriage means, and an anchor member securing said carriage means to said loop of cable for reversible pulling actuation thereby.

3. In an X-ray apparatus including a film carriage means movable rectilinearly along a path between two positions, the combination therewith of a fluid pressure cylinder disposed parallel to said path, said cylinder including a double-acting reciprocable piston member and end caps defining pressure chambers at opposite sides of said piston member, a single-loop flexible cable means secured at opposite ends to said piston member and having portions in pressure-sealed extension through said end caps, pulley means arranged to direct movement of said cable means into and out of said end caps and along a path parallel to that of said film carriage means, whereby selective preponderant pressurization of the aforesaid pressure chambers effects movement of said cable means along its aforesaid path in a selective direction and anchor means securing said film carriage means to said cable means for pulling movement thereby.

4. In an X-ray spotfilm device comprising a generally rectangular housing having side, back, front, top and bottom walls and a film carriage disposed within such housing and movable between front and back positions along a path parallel to the side walls thereof, the combination therewith of a double-acting fixed-length cylinder mounted within said housing parallel to said path, said cylinder including closures at its opposite ends, respectively, and a piston slidably disposed therein subject opposingly to pressure of fluid on its opposite faces in chambers respectively to such closures, fluid pressure conveying means for selective supply and release of fluid under pressure to and from said chambers, a single-loop flexible tension-transmitting smooth-coated cable means secured to and extending in opposite directions from said piston outwardly in slidable fluid pressure sealed relationship through openings in the end closures of said cylinder and along an inversion path directed backwardly alongside of said cylinder to a point of attachment to said film carriage for actuating same along said path in both directions selectively, and guide means for directing the course of cable movement into and out of said closures and along said inversion path.

References Cited by the Examiner
UNITED STATES PATENTS

| | | | |
|---|---|---|---|
| 2,890,346 | 6/1959 | Kizaur et al. | 250—66 |
| 3,163,989 | 1/1965 | Maxwell | 250—63 |
| 3,173,007 | 3/1965 | Maxwell | 250—63 |

RALPH G. NILSON, *Primary Examiner.*

A. L. BIRCH, *Assistant Examiner.*